(12) United States Patent
Stanford-Jason

(10) Patent No.: US 8,843,902 B2
(45) Date of Patent: Sep. 23, 2014

(54) PROGRAM FLOW ROUTE CONSTRUCTOR

(75) Inventor: Andrew Stanford-Jason, Salisbury (GB)

(73) Assignee: XMOS Ltd., London (GB)

(*) Notice: Subject to any disclaimer, the term of this patent is extended or adjusted under 35 U.S.C. 154(b) by 431 days.

(21) Appl. No.: 12/723,444

(22) Filed: Mar. 12, 2010

(65) Prior Publication Data

US 2011/0225570 A1 Sep. 15, 2011

(51) Int. Cl.
*G06F 9/45* (2006.01)
*G06F 11/36* (2006.01)

(52) U.S. Cl.
CPC .................................. *G06F 11/3604* (2013.01)
USPC ............ 717/132; 717/144; 717/154; 717/156

(58) Field of Classification Search
CPC .................... G06F 17/30958; G06F 17/30961; G06F 8/00
See application file for complete search history.

(56) References Cited

U.S. PATENT DOCUMENTS

| | | | | |
|---|---|---|---|---|
| 5,613,117 | A * | 3/1997 | Davidson et al. | 717/144 |
| 5,790,859 | A * | 8/1998 | Sarkar | 717/130 |
| 6,070,009 | A * | 5/2000 | Dean et al. | 717/130 |
| 7,181,730 | B2 * | 2/2007 | Pitsianis et al. | 717/132 |
| 7,386,838 | B2 * | 6/2008 | Schmidt | 717/130 |
| 7,853,932 | B2 * | 12/2010 | Chockler et al. | 717/132 |
| 8,046,751 | B1 * | 10/2011 | Avadhanula et al. | 717/156 |
| 8,719,801 | B2 * | 5/2014 | Gulwani et al. | 717/132 |
| 2003/0233640 | A1 * | 12/2003 | Reynaud | 717/154 |
| 2009/0249308 | A1 * | 10/2009 | Li et al. | 717/132 |
| 2009/0249309 | A1 * | 10/2009 | Li et al. | 717/132 |
| 2010/0029388 | A1 * | 2/2010 | Ashida et al. | 463/42 |
| 2010/0083240 | A1 * | 4/2010 | Siman | 717/144 |

OTHER PUBLICATIONS

Björn Lisper; Fully Automatic Parametric Worst-Case Execution Time Analysis; 2003 WCET; 12 pages; <http://www.es.mdh.se/pdf_publications/439.pdf>.*
Jeffrey Kodosky et al.; Visual Programming Using Structured Data Flow; 1991 IEEE; pp. 34-39; <http://ieeexplore.ieee.org/stamp/stamp.jsp?tp=&arnumber=238853>.*
Brad A. Myers; Visual Programming, Programming by Example and Program Visualization A taxonomy; 1986 ACM; pp. 59-66; <http://dl.acm.org/citation.cfm?id=22349>.*
Sherif M. Yacoub et al.; Scenario-Based Reliability Analysis of Component-Based Software1 ; 1999 IEEE; 10 pages; <http://ieeexplore.ieee.org/stamp/stamp.jsp?tp=&arnumber=809307>.*

(Continued)

*Primary Examiner* — Thuy Dao
*Assistant Examiner* — Cuong V Luu
(74) *Attorney, Agent, or Firm* — Sughrue Mion, PLLC

(57) ABSTRACT

A method and corresponding tool for estimating program execution time. A higher-level structure is received as an input, representing control flow through an executable program. The higher-level structure comprises one or more levels of parent nodes, each parent node representing internal structure comprising a group of one or more child nodes and one or more associated edges between nodes. The levels of the higher-level structure are probed to extract a substructure representing a route through the program from a start instruction to an end instruction, by selectively extracting nodes of different levels of parent to represent different regions along the route in dependence on a location of the start and end instructions relative to the levels of parent nodes. An execution time for the route through the program is estimated based on the extracted substructure, and a modification affecting the execution time is made in dependence on the estimation.

17 Claims, 16 Drawing Sheets

(56) References Cited

OTHER PUBLICATIONS

L. R. Power; Design and use of a program execution analyzer; 1983 IBM Systems Journal; pp. 271-294; <http://ieeexplore.ieee.org/stamp/stamp.jsp?tp=&arnumber=5387830>.*

Marion G. Harmon et al.; A Retargetable Technique for Predicting Execution Time; 1992 IEEE; pp. 68-77; <http://ieeexplore.ieee.org/stamp/stamp.jsp?tp=&arnumber=242675>.*

European Search Report corresponding to European Patent Application No. 11157915.7, dated Jul. 14, 2011.

Vugranam C. Sreedhar, et al., Identifying Loops Using DJ Graphs, vol. 18, No. 6, Nov. 1, 1996, pp. 649-658, XP55001672.

Johan Eriksson, et al., A Tool Concept for Execution Time Analysis of Legacy Systems, 2002, pp. 1-4, XP002646188.

* cited by examiner

PROGRAM FLOW ROUTE CONSTRUCTOR

FIELD OF THE INVENTION

The present invention relates to analysis of a program to be executed on a processor, in order to identify a possible modification to the program or its manner of execution and to thereby improve the operation of the processor on which the program is to be executed.

BACKGROUND

A structural analyser is a computer implemented software tool for analysing the control flow of an executable program to be executed on a target processor, with the aim of checking whether the program will execute as expected and if not to make appropriate modifications. Before describing the operation of a structural analyser, it may be useful to introduce a few concepts.

A basic block is a sequence of statements, in this case processor instructions, that are executed in order from the first statement to the last statement in the block. A basic block cannot contain any branch instructions until the last instruction of the block, and therefore execution is never transferred to another basic block until its last instruction has been executed.

A control-flow graph is a data structure used in static analysis to represent possible flows of execution through a program. A control flow graph G=(N, E) has nodes n∈N representing basic blocks and directed edges (s, d)∈E representing transfer of execution from the source node s to the destination node d. Algorithms for identifying basic blocks and generating control flow graphs are known in the art.

A simple example is illustrated in FIG. 1, which shows a control flow graph where each node labeled 1 to 5 represents a basic block, and the arrowed edges represent possible program flow between nodes.

In a control-flow graph, if every path of execution to some node n must pass through another node d, then d is said to dominate n. Also, every node dominates itself. There are efficient linear-time algorithms for computing dominance, also known in the art.

The phrase "Depth First Search Post Order" refers to an algorithm for searching a graph whereby, beginning from the root of the graph, the algorithm explores as far as possible along each branch before backtracking. In order to make the search "post order", the nodes of the graph are listed in the order that they were last visited by the algorithm.

Structural analysis is a known technique that has the goal of identifying control flow structure. Typically the structural analyser begins by taking a binary executable program file, decoding the machine code instructions of the executable program, and generating a control flow graph based on the decoded instructions. The control flow graph comprises a plurality of low-level nodes each representing a basic block of machine code instructions, and also comprising a plurality of directional edges representing program flow between the nodes. To perform the structural analysis, the structural analyser then reduces the lower-level (more detailed) control flow graph to a higher-level (more abstracted) structural representation comprising higher-level structure nodes, each higher-level structure node having internal structure (i.e. each representing one or more lower-level nodes and one or more edges).

Typically, a predetermined set of higher-level structure node types appropriate for the language are chosen to be matched against a control-flow graph. The nodes of the control flow graph are traversed in depth first search post order. During the traversal, if a structure node pattern can be matched to the graph then the matching nodes are removed and replaced with a structure node. For example, consider the control-flow graph in FIG. 1 and a structural analysis algorithm that has just two structure node types: one for matching if-then-else patterns ($S_a$) and one for matching sequences of basic blocks ($S_b$). These are illustrated schematically in FIG. 2.

A pattern matching hierarchy is required if the algorithm is to be deterministic. For this example, let the if-then-else node have preference over the sequential pair node. The pattern matcher first tries to match the pattern at the top of the pattern hierarchy on every node in order, then it tries the next pattern and so on. If a match is made then the pattern matcher resets and the whole process is repeated. This continues until there is only a single node.

Referring to the example of FIG. 1, this would then lead to the algorithm behaving as follows. FIG. 3 illustrates the replacements made on the control-flow graph during the execution of the algorithm.

(i) Perform a depth first post order search on the graph to determine the order that the nodes will be traversed in. In this case the resulting order of the nodes would be: 5, 4, 3, 2, 1.
(ii) Try to match the if-then-else type structure node pattern starting from node 5. No match is found.
(iii) Continue to try to match the if-then-else node pattern starting from node 4, 3, 2 and then 1. No match is found until node 1 at which the pattern is found to match.
(iv) Replace the covered nodes with a new, higher-level structure node, node 6, and connect it to the edges of the removed nodes.
(v) Repeat from the start trying to match the if-then-else pattern again, this time the order of traversal is: 5, 4, 6.
(vi) When the if-then-else node has failed, try to match the sequential pair node by the same method.
(vii) Node 4 will make a match, consuming nodes 4 and 5 into a new structure node 7. The traversal order is now: 7, 6.
(viii) No further if-then-else matches are found, but Node 6 will make a match to a sequential pair, consuming nodes 6 and 7 to make a new, even higher level structure node 8.

This gives an example of the steps a structural analysis algorithm would take to reduce a control-flow graph to a single structure node.

In some cases a control flow graph may contain irreducible regions which cannot be matched to any of the analyser's higher-level structure node patterns. A known solution to dealing with the problem of irreducible graphs is node splitting. This is the process of transforming an irreducible region into a reducible one by splitting some of the nodes. The aim of node splitting is that the graph after the transformation will still represent the same control-flow but is closer to matching one of the structure node patterns.

SUMMARY

It would be useful to analyse the timing of an executable program, particularly the execution time between two points in a program. However, the inventors have recognised that existing structural analysis techniques are not well suited to timing analysis.

According to one aspect of the present invention, there is provided a method comprising:

receiving as an input: (a) a higher-level structure representing control flow through an executable program, the higher-level structure comprising one or more levels of parent nodes, each parent node representing internal structure comprising a group of one or more child nodes and one or more associated edges between nodes; and (b) an indication of at least one start and end instruction;

probing the levels of the higher-level structure to extract a substructure representing a route through the program from the start to the end instruction, by selectively extracting nodes of different levels of parent or child to represent different regions along the route in dependence on a location of the start and end instructions relative to the parent nodes; and based on the extracted substructure, estimating an execution time for the route through the program, and making a modification affecting the execution time in dependence on said estimation.

Thus the present invention advantageously allows the time for execution between any two (or more) arbitrary points in the program to be determined, but whilst retaining some of the higher level structure.

Preferably the higher-level structure comprises multiple levels of parent nodes, wherein at least one level of child nodes are themselves parents, and said probing is performed by selectively extracting nodes of different levels of parent to represent different regions along the route in dependence on the location of the start and end instructions relative to the parent nodes.

In embodiments, the extraction comprises steps of:

(i) determining the highest level parent node for which the start instruction is the initial instruction in the parent node, and setting this parent as the current node;

(ii) adding the current node to the substructure, determining whether the current node comprises a node representing an end instruction, and if not determining a successor of the current node and then setting the successor as the new current node and repeating step (ii) until the current node is found to comprise a node representing an end instruction; and (iii) once an end instruction is found in the current node, exploring the internal structure of the current node and adding to the substructure a portion of that internal structure representing a relevant portion of the route to the end instruction;

such that said estimation and modification are based on the substructure as extracted by said steps.

The estimation of said execution time may comprise determining an associated time for each of the nodes in the substructure and combining the associated times, each associated time corresponding to the level of its respective parent node as included in the substructure, and the estimation may be performed on the basis of each associated time as a whole.

The estimation of said execution time may be performed after generation of said substructure and without analysing the internal structure of any node in the substructure once extracted.

The method may further comprise receiving as an input: (c) an indication of at least one excluded instruction;

wherein the substructure may represent a route excluding the excluded instruction, and the extraction may be dependent on a location of the excluded instruction relative to the levels of parent nodes.

In further embodiments:

step (ii) may comprise determining whether the current node comprises a node representing either of an end instruction or an excluded instruction, and repeating step (ii) until the current node is found to comprise a node representing either an end instruction or excluded instruction; and step (iii) may comprise exploring the internal structure of the current node and adding to the substructure a portion of that internal structure a relevant portion of the route to the end instruction or excluding the excluded instruction as appropriate, and repeating from step (ii) if the current node was determined to contain an excluded instruction but not an end instruction.

The method may comprise receiving an indication of multiple start instructions as an input, extracting a separate substructure for each start instruction, and estimating a respective execution time based on each substructure, wherein said modification may be dependent on the execution times.

The method may comprise receiving an indication of multiple end instructions as an input, wherein said estimation may comprise estimating a worst case execution time with respect to all end instructions, and said modification may be dependent on the worst case execution time.

At least one of the nodes representing a start instruction may not be found at the beginning of any parent node, and/or at least one of the nodes representing an end instruction may not be found at the end of any parent node.

The higher-level structure may comprise at least three levels of parent nodes, and at least two levels of child nodes may themselves be parents.

The method may comprise initial steps of decoding said portion of the executable program, generating a lower-level structure representing the executable program based on said decoding, and then generating the higher-level structure from the lower-level structure.

Said modification may comprise modifying the executable program. Said modification may comprise modifying a portion of source code and re-compiling the program from the source code.

Said modification may comprise changing a characteristic of the processor. Said modification may comprise changing a clock speed of the processor.

According to another aspect of the present invention, there is provided a software tool embodied on a computer readable medium. This software may be operable so as when run on a computer to perform a method having any of the above features.

BRIEF DESCRIPTION OF THE DRAWINGS

For a better understanding of the present invention and to show how it may be put into effect, reference is now made by way of example to the accompanying drawings in which.

DETAILED DESCRIPTION OF PREFERRED EMBODIMENTS

Figure 1:
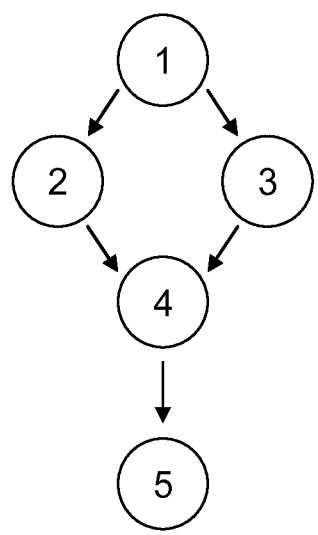
FIG. 1 is a schematic illustration of a control flow graph.
Figure 2:
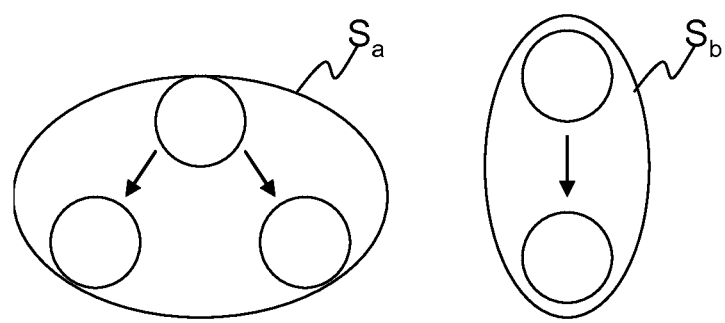
FIG. 2 is a schematic illustration of some structure node patterns.

One aspect of the present invention provides a method of structural analysis for an executable program, and a structural analyser tool for implementing this method.

The method preferably begins by decoding a portion of an executable program to be analysed. That is to say, the structural analyser takes an executable binary file which has already been compiled and is in a state ready for being run on a processor, decodes it in order to generate a control flow graph, and then uses the control flow graph to perform a static analysis in order to generate a higher-level structural representation and thereby estimate information about the manner in which the program will run on the target processor (i.e. the processor for which the program is intended). The analysed portion may comprise some or all of the executable code within an executable program.

For example, if the target processor is an Xcore or array of Xcores designed by XMOS Ltd, then the structural algorithm will accept an XE binary and returns from it a structural representation of the program control flow. The Xcore has a special instruction set architecture tailored for multi-core and multi-thread processing. However, it will be appreciated that the structural analysis described herein can also be applied to other processors having other instruction set architectures.

Decoding in this context is the process of taking the binary machine code instructions of the executable program, and determining the meaning of each instruction's respective opcode and any respective operands.

In alternative embodiments however, the control flow graph could be generated from an assembly file in which the instructions are represented in assembly language, or the structural analyser could analyse a control flow graph representing the proposed output of a compiler.

As mentioned, the aim of the structural analysis is to determine information about how the program will execute on its target processor, and if necessary make appropriate modifications to the code and/or target processor to improve the manner in which it executes. Particularly, it is an aim of the present invention to estimate one or more timing properties of the program, in order to make any modifications that may be required to improve any of those one or more timing properties. For example, the analysis may result in an estimated time (duration) for the program to execute, or an estimate of the duration of one or more particular parts of the program, or an estimate of the taken to reach a certain point in the program. Such information could then be used for example to modify the program itself to make it run more efficiently, typically by modifying the source code from which the executable program was compiled and then re-compiling the modified source code. Alternatively or additionally, such information could be used for example to modify a property of the target processor itself which will effect the timing of the program when executed. Modifying the processor could involve changing the processor's clock speed, e.g. by turning down the processor's clock speed in order to reduce power if the result of the analysis indicates that a lower speed could be tolerated; or if the processor is for running a specific piece of software, it could even involve modifying the design of the processor to provide increased hardware resources such as extra memory, registers, channels, ports, etc. In the case of varying the clock speed, this could be done by inserting one or more suitable instructions into the program which dynamically adjust the clock speed when executed.

According to the preferred embodiments of the present invention, the higher-level structural representation is generated by matching structure node patterns to the control flow graph from a special predetermined set of structure node patterns. Particularly, to facilitate timing analysis, the predetermined set consists only of patterns having zero or one entry points (i.e. at most one point at which an edge in the resulting higher-level structural representation can flow into the higher-level structure node) and zero or one exit points (i.e. at most one point from which an edge in the resulting higher-level structural representation can flow out of the higher-level structure node). When generating the higher-level structural representation from the lower-level control flow graph, the structure node patterns used in this matching processes are selected exclusively from this special predetermined set of "one-in, one-out" patterns (or rather, at most one-in, one-out).

Unlike many implementations of structural analysis, embodiments of the present invention are not directed towards a particular programming language. Therefore the nodes representing the structure have to be generic, yet also be conducive to ascertaining timing results.

A preferred example of such a set is illustrated schematically in FIGS. 6 to 11.

Figure 9:
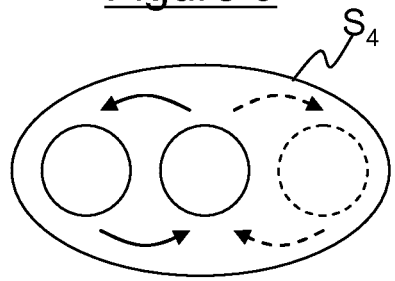
FIG. 9 is a schematic illustration of an infinite loop-type structure node.
Figure 10:
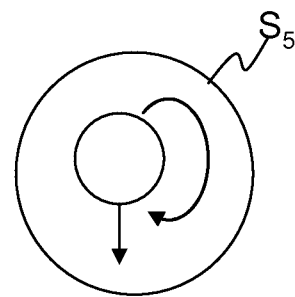
FIG. 10 is a schematic illustration of a finite self-loop-type structure node.
Figure 11:
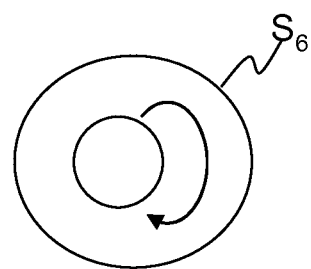
FIG. 11 is a schematic illustration of an infinite self-loop-type structure node, FIG. 12 schematically illustrates use of a null node, FIG. 13 schematically illustrates a pattern matching hierarchy, FIG. 14 schematically illustrates an alternative pattern matching, FIGS. 15*a*-15*c* schematically illustrate use of a function node.

In addition to primitive nodes (representing individual instructions) and basic blocks (discussed above), in the special set of "one-in, one-out" structure nodes according to preferred embodiments of the present invention there are provided six key higher-level structure node types, each representing a different pattern of control-flow structure, as shown in FIGS. 6 to 11. They are: a sequence type structure node (FIG. 6), a conditional type structure node (FIG. 7), a finite loop type structure node (FIG. 8), an infinite loop type structure (FIG. 9), a finite self-loop type structure node (FIG. 10) and an infinite self-loop type structure node (FIG. 11). To achieve deterministic timing analysis, no other higher-level structure node patterns having any more than one entry point and one exit point should be used in generating any higher-level structural representation that is substantially used in the analysis.

Preferably, there is also provided a special "function node", for use as a place-holder node to represent any generic function. The function node should have the (at most) "one-in, one-out" property discussed above. Furthermore, there may also be provided a "null node" for use in terminating multiple terminating nodes of the program if necessary (i.e. if the program has two different possible ways to terminate). The null node is not in itself a higher-level structure node (it has no internal structure, and in itself represents no pattern): rather, it is an elementary, lower-level node that is inserted into the lower-level control flow graph before generating the higher-level structural representation, in order to represent a single terminating point of the program and thereby create a reducible form in the control flow graph. These function and null nodes will be discussed in more detail shortly in relation to FIGS. 12 and 15a to 15c.

In FIGS. 6 to 11, solid-outlined white nodes represent nodes that there must be exactly one of in the respective pattern, dotted nodes represent a node that there may be zero or more of, and cross-hatched nodes are neighboring nodes not included in the structure node pattern in question but shown for context in order to aid representation. The possible control-flow structures that a structure node can represent are as follows.

Figure 6:
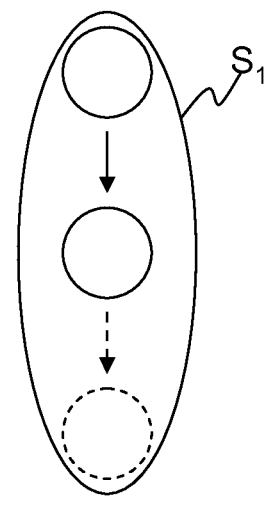
FIG. 6 is a schematic illustration of a sequence-type structure node.

FIG. 6 schematically illustrates a sequence type structure node pattern $S_1$ of the special predetermined set. This pattern forms a sequence of nodes through which there is only one path. The sequence must contain at least the two solid nodes and should be as many nodes long as is possible.

Figure 7:
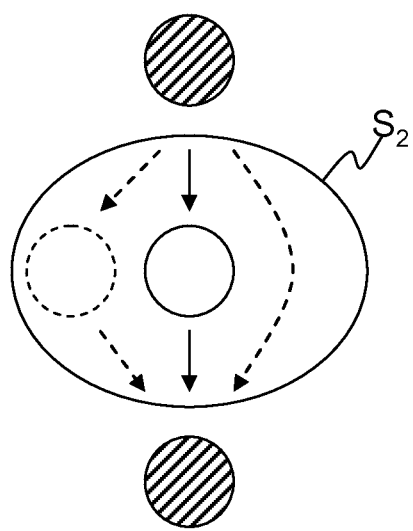
FIG. 7 is a schematic illustration of a conditional-type structure node.

FIG. 7 schematically illustrates a conditional type structure node pattern $S_2$ of the special predetermined set. This pattern is used to represent if-then-else statements, switches and select statements. There can be an arbitrary number of conditions with the option of a jump over all options. There must be at least: (i) one option with a jump, and (ii) two options.

Figure 8:
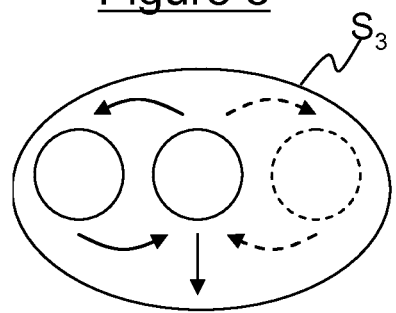
FIG. 8 is a schematic illustration of a finite loop-type structure node.

FIGS. 8 and 9 schematically illustrate a finite loop type structure node pattern $S_3$ and an infinite loop type structure node pattern $S_4$ respectively, both also included in the special predetermined set. A loop is a pattern of control-flow which results in the possibility of a sequence of execution that can repeat. Both flavours of the loop node contain a loop head and one or more loop bodies. The only difference between the finite loop node and the infinite is that the infinite loop has no control-flow that ever escapes the head other than to the bodies.

FIGS. 10 and 11 schematically illustrate a finite self-loop type structure node pattern $S_5$ and an infinite self-loop type structure node pattern $S_6$ respectively, again both also included in the special predetermined set. Both finite and infinite self loop nodes have a single node that can repeat an arbitrary number of times. As with the loop nodes, the difference between the finite and infinite loop is that no control-flow ever escapes the infinite loop.

Each of the above higher-level structure nodes has the property of having at most one point of entry and one point of exit, in exactly the same way as basic blocks. That is, at most one point into which program flow control can enter, and at most one point from which program flow can exit. Each of these structure nodes has the property that their execution time is a sum of its component nodes, except for the primitive node for which execution time can be derived from properties of the architecture. There are no structure nodes that will match irreducible control flow patterns.

Hence, the result of matching these structure node patterns to the control flow graph is that it is possible to determine how long each structure node (i.e. each analysed structural unit) will take to execute. Without this special set of structure nodes, it would difficult to determine the timing of an arbitrary graph of nodes having too many ways in and/or too many ways out. Using a special one-in, one-out set on the other hand, each structure node can be allocated a deterministic execution time being the sum of its component lower-level nodes. In the case of some structure nodes such as the conditional node for example, it may be necessary to allocate a "worst case" time to the structure node (i.e. the longest of the two or more possible branches).

Note also that in the case of a loop or self-loop type structure node, if the loop is not broken down and is instead represented as a whole, then its internal loop count can be maintained and used to determine the time for that loop as a whole. E.g. the loop of FIG. 8 can be allocated a single deterministic execution time based on its internal iteration count.

Figure 13:
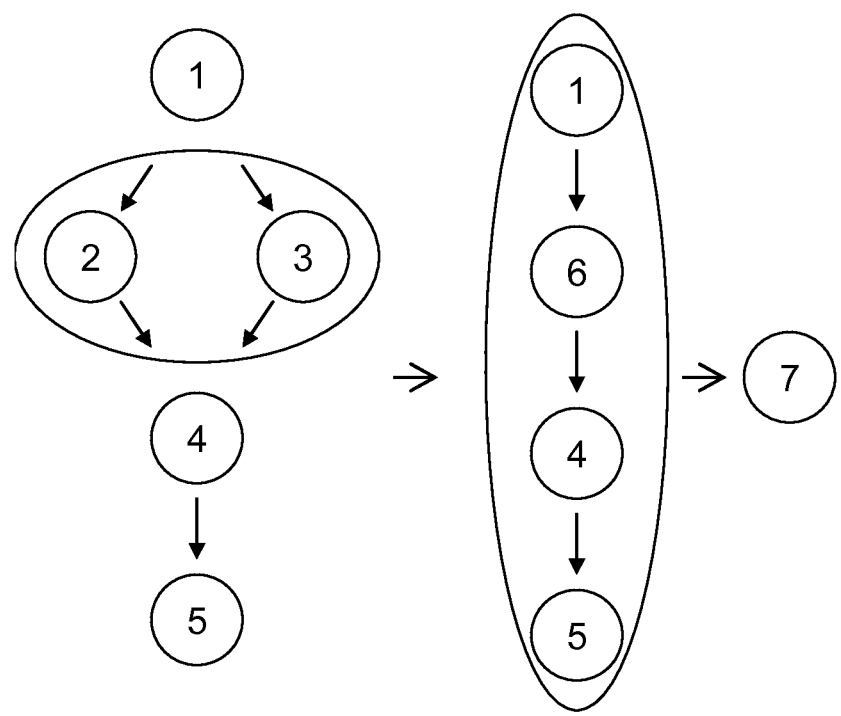

An example analysis is now described in relation to FIG. 13.

The process begins with a control-flow graph G=(N,E) having nodes n∈N where N is the set of structure nodes and E is defined as before. It must contain no more than one node that has no predecessors; such a node, if present, is known as the graph start node. The whole graph must be reachable from the graph start node. If no such node is present then a node has to be selected such that the reachability property is maintained.

Note that the term "graph" as used herein doesn't necessarily mean something displayed visually to a user (though preferably the structural analyser should be operable to generate a visual graph for viewing on screen by the user). The "graph" could be any data structure having meaning to the structural analyser itself, rather than to a user. Generally, the term "control flow structure" may be used herein to refer to any graph, file or other data structure representing the program's control flow.

Figure 14:
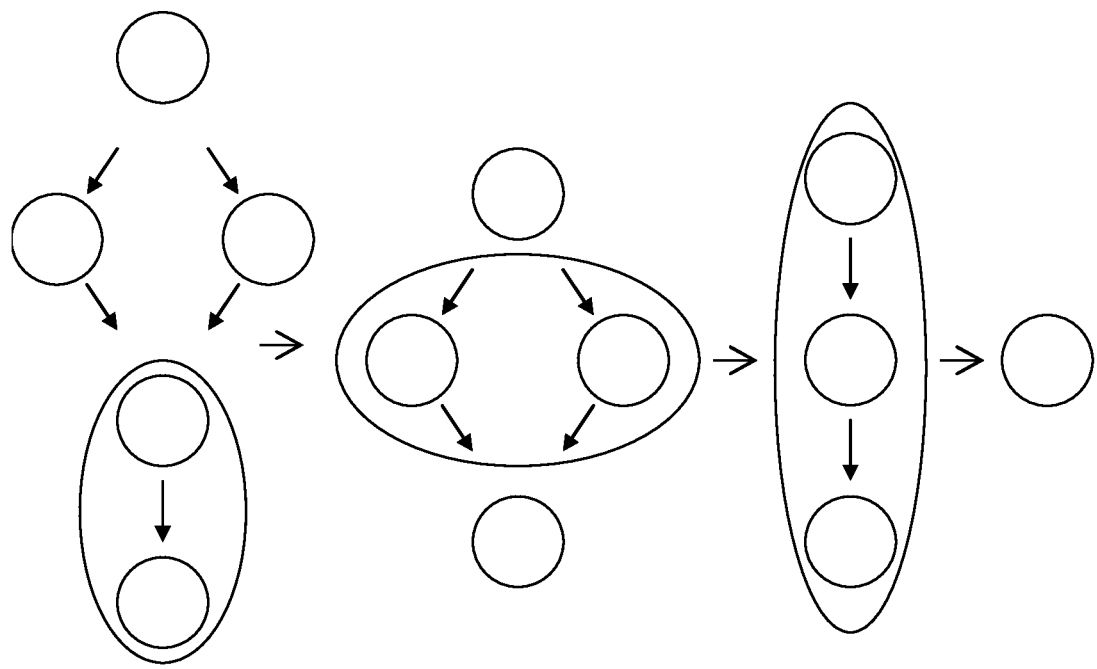

The patterns are preferably matched according to a pattern matching hierarchy. During the structural analysis, the order in which the structure nodes are matched to the control-flow graph determines how understandable to a human user the final structural graph will be. As the patterns are being matched, the order of the matching is key to producing efficient results that are also intuitive to a user. For example, the following example transformation sequences of FIGS. 13 and 14 illustrate the difference between a good pattern matching hierarchy (FIG. 13) and a bad one (FIG. 14). The second graph results from the sequence node matching before the conditional node. The intuitive result could be described as a sequence of nodes with a condition in the sequence, whereas the non-intuitive result could be described as a sequence of nodes with a condition followed by another sequence. The first result is preferable: FIG. 13 provides an intuitive result in two steps, whilst FIG. 14 provides a less intuitive result in three steps.

The pattern matching order is preferably:
(i) (Finite/infinite) self loop
(ii) (Finite/Infinite) loop
(iii) Conditional
(iv) Sequence
(v) Node splitting (see below)

The structural analyser traverses the control flow graph in depth first search post order, searching for a pattern of the highest hierarchical order. If it doesn't find one, it traverses the graph again looking for the next type of pattern in the hierarchy, and so on, until a match is found. When a pattern match is found, the structural analyser replaces the matched pattern with the corresponding higher-level structure node from the predetermined set of types, then resets the search (i.e. begins to traverse the graph again starting with searching for a pattern of the highest hierarchical order). If no matches can be found, the structural analyser can split an irreducible part of the graph into two or more reducible portions, which will be discussed in more detail shortly.

So in the example of FIG. 14, the structural analyser first looks for a self loop, and then a general loop, but doesn't find either. It then looks for a conditional type pattern and does find one (nodes 2 and 3), and so replaces the conditional pattern with a corresponding higher-level structure node (node 6) representing the conditional type pattern. The structural analyser then resets the search, traversing the updated graph again, first searching for a self loop, then any other loop, and then a conditional pattern, but finding none of these. Then the structural analyser looks for a sequence type node and does find one (nodes 1, 6, 4 and 5), so replaces them with a corresponding higher-level structure node (node 7) representing the sequence type pattern. The structural analyser tool can then be queried to obtain the execution time of higher-level structure nodes 6 or 7.

Note that the set of structure node patterns should preferably be a "complete" set, in that they should always allow any control flow graph to be reduced to a single higher-level structure node after repeated rounds of matching.

Some additional techniques may be used to improve the analysis of more complex control flow graphs, as now discussed.

Figure 12:
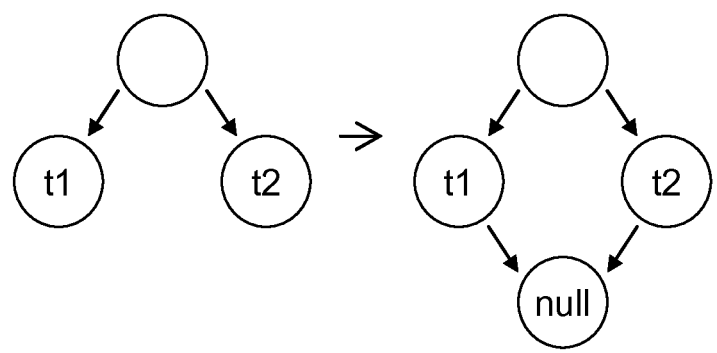

The null node may be used to force a control flow graph to contain less than two terminal nodes. In the above set, there is no pattern to match a node that forks where every fork is a terminating path on the control flow graph. For this reason when this case occurs a null node has to be added to the graph. If the number of terminating nodes is greater than one then all terminating nodes must have a directed edge pointing towards the newly created null node. FIG. 12 illustrates a situation where a null node would be required, showing a null node added to a multiple terminating control-flow graph (with two terminating nodes t1 and t2).

The null node is advantageous because it allows patterns from the one-in, one-out set to be matched to terminating parts of the program even when the program has alternate points of termination.

In order to ensure that no null nodes remain in the structural graph when the algorithm is complete, a modification to the sequence pattern matcher is required: the sequence pattern must never match the null node as its final node until there are only two nodes left in the graph. At this point the null node should be removed and the graph has been reduced to a single node. As the null nodes are always removed during analysis the final structure can never contain any null nodes.

If parts of the graph cannot be matched to one of the predetermined set of patterns, a node splitting step may be required. The control-flow graph is said to be irreducible when none of the structure nodes will match to any of the nodes in the control-flow graph. When the control-flow graph has reached an irreducible state then node splitting decisions have to be made, as often there is more than one node that is capable of being split. By performing less node splitting the size of the graph will not grow so much, which is preferable for algorithm run-time performance. Basically, the algorithm below works by searching from an initial node, i, by a depth-first search method, to another node, n, such that n is dominated by i and nothing else in between. When a node n has been found it is split either with the up or down wedge depending on how n is connected within the graph. Preference is given to the up wedge. To find the node to split the following algorithm is used.

```
boolean findAndSplitNode (Node initialNode) {
    if (initialNode.next | <2) {
        return false;
    }
    return explore(iNode, empty, dom(initialNode));
}
boolean explore (Node node, Set<Node> seen, Set<Node> iDoms)
{
    if (iDoms + node == dom(node)) {
        if(|node.next| > 1 and |node.prev| == 1) {
            wedgeUp (node);
            return true;
        }
        if (|node.next| == 1 and |node.prev| > 1)
            wedgeDown(node);
            return true;
        }
    }
    seen.add(node);
    for(all nodes succedding node not in seen){
        if(explore(next, seen, iDoms))
            return true;
    }
    return false;
}
```

Figure 4A:
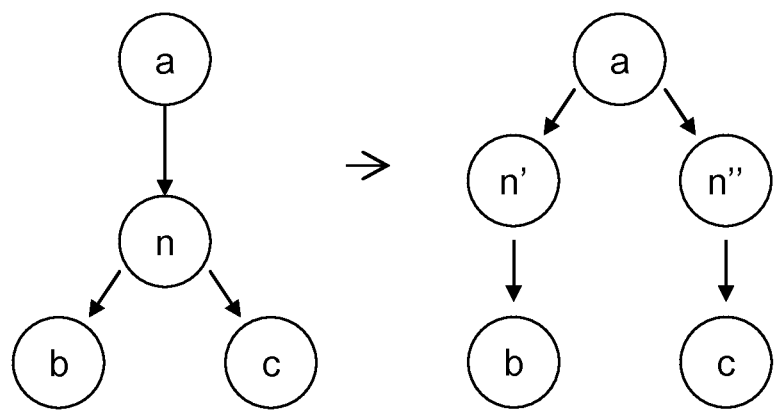
FIG. 4a is a schematic illustration of an up wedge.

FIG. 4a illustrates an "up wedge". This takes a control-flow graph which forks and promotes the fork up an edge. In general the up-wedge works on a fork from one node to many. However, for illustrative purposes the example in FIG. 4a shows a fork of one to two paths. In FIG. 4a, the contents of the node n' and n" are exact copies of what was in n.

Figure 4B:
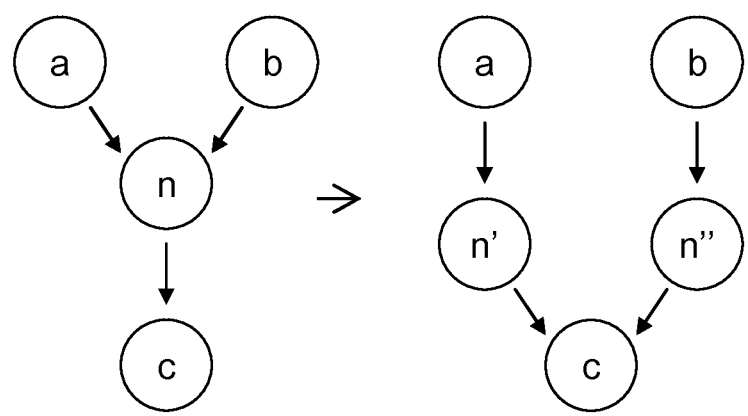
FIG. 4b is a schematic illustration of a down wedge.

FIG. 4b illustrates a "down wedge". This follows the same pattern as the up wedge but with the control-flow graph in reverse. As with the up wedge the general transformer is a many-to-one join but FIG. 4b shows only a two-to-one join for illustrative purposes. In FIG. 4b, the contents of the node n' and n" are exact copies of what was in n.

Figure 5:
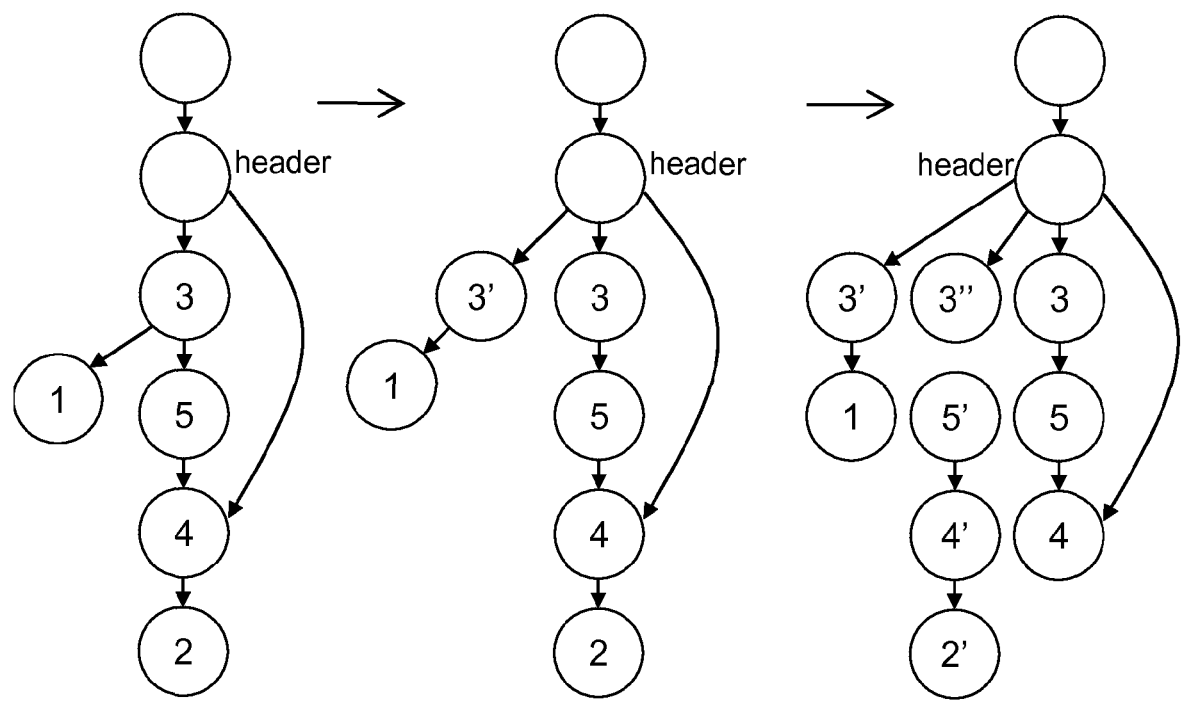
FIG. 5 schematically illustrates an application of node splitting.

FIGS. 4a and 4b illustrate these node splitting techniques in isolation and therefore somewhat out of context. In context, node splitting works to improve the structure of the graph. FIG. 5 shows an example in context, in relation to a loop with two exits. All loops have a loop header (this is the entry point to the loop), and optionally one or more exits. FIG. 5 represents a loop with two exits, which no patterns will match. It's not until the final transformation in the picture that the loop has its exits at the same point as its header. When this happens the graph can be reduced using the described method.

All loops can be put into one of two types: reducible and irreducible. Irreducible loops are those with multiple edges of entry in to the loop and reducible loops are those with a single edge of entry.

To complement the above techniques, particularly for more complex control flow graphs, an additional function node can be used to represent whole functions within the graph. The function node acts as a wrapper node that adds extra structure to the structural representation. Each function node should also have the property of having at most one point of entry and one point of exit. An example of an overall algorithm for structural analysis involving the function node is described in relation to FIGS. 15a to 15c.

The first step is to decode the executable section of the binary

The second step is, treating each instruction as a node in a graph, to add directed edges from each node to all of its possible successors. A traditional control flow graph has now been formed. For example, the control-flow graph could look like FIG. 15a.

Figure 15A:
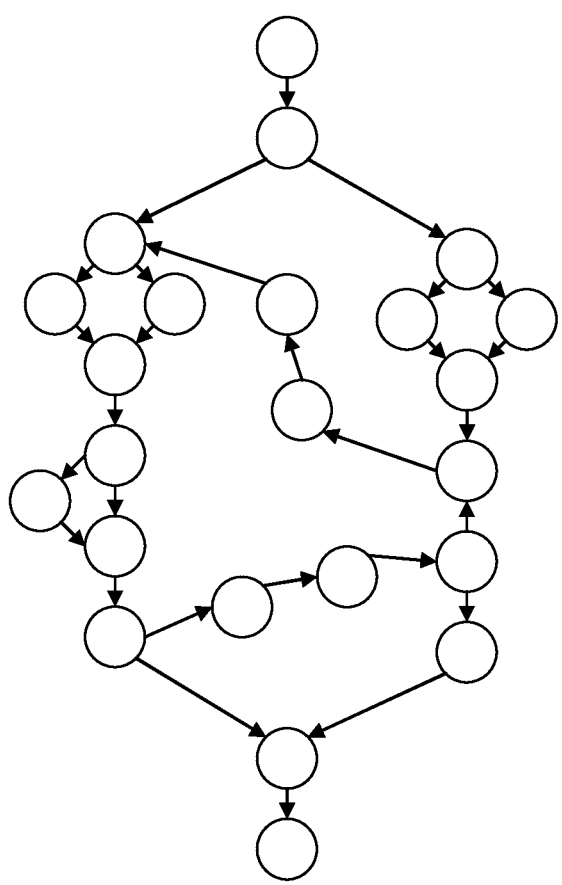
Figure 15B:
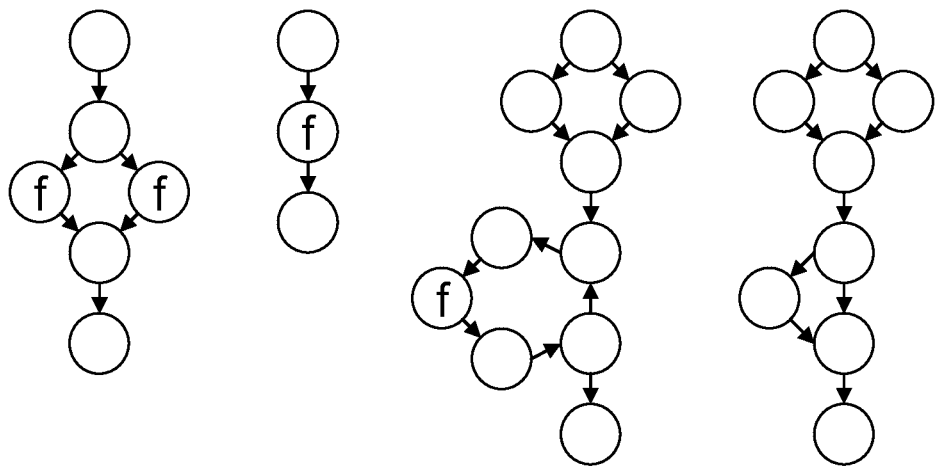

The third step is to expand the graph into a collection of control-flow graphs, one for each function. If the example is continued then the resulting function control-flow graphs would be as shown in FIG. 15b. The two nodes marked with an "f" represent function calls to their respective functions.

Figure 15C:
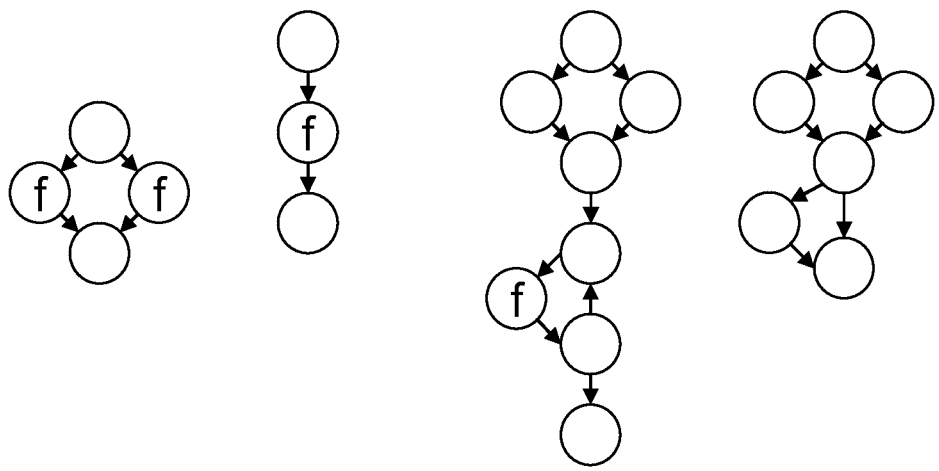

The fourth step is, for each graph, to detect all the basic blocks, using the standard definition of a basic block and replace each basic block of instructions with a block node. This is illustrated in FIG. 15c.

The fifth step is, for each control flow graph, to apply the structural analysis algorithm to it, in a similar to the example of FIG. 13. This will reduce each function to a single node. The structural analyser tool can then be queried to determine the execution time of any of the higher-level structure nodes generated in this manner.

The structural analyser described above thus provides a useful tool for analysing the timing of an executable program. However, the technique described so far is limited to determining the execution time of a complete structure node as a whole. That is, the higher-level structural representation in the form as output by the structural analyser does not in itself have a suitable resolution to allow the time between any two arbitrarily chosen points in the program to be queried (i.e. between any two instructions the user should wish to specify). On the other hand, the "raw" lower-level control flow graph, before having been condensed by the structural analyser, will typically be too complex to directly determine the time between any two chosen points (the complexity of the task rises exponentially with the number of nodes considered).

According to one aspect, the present invention solves this problem by probing into the higher-level structural representation and extracting different levels of structure along a route between the chosen start and end point instructions, in dependence on the location of the start and end points relative to those levels. This advantageously allows the time between any two arbitrary points in the program to be determined, but whilst maintaining some of the structure of the higher-level structural representation where appropriate, and without incurring the complexity of having to work directly from a fully expanded lower-level control flow graph.

Figure 19:
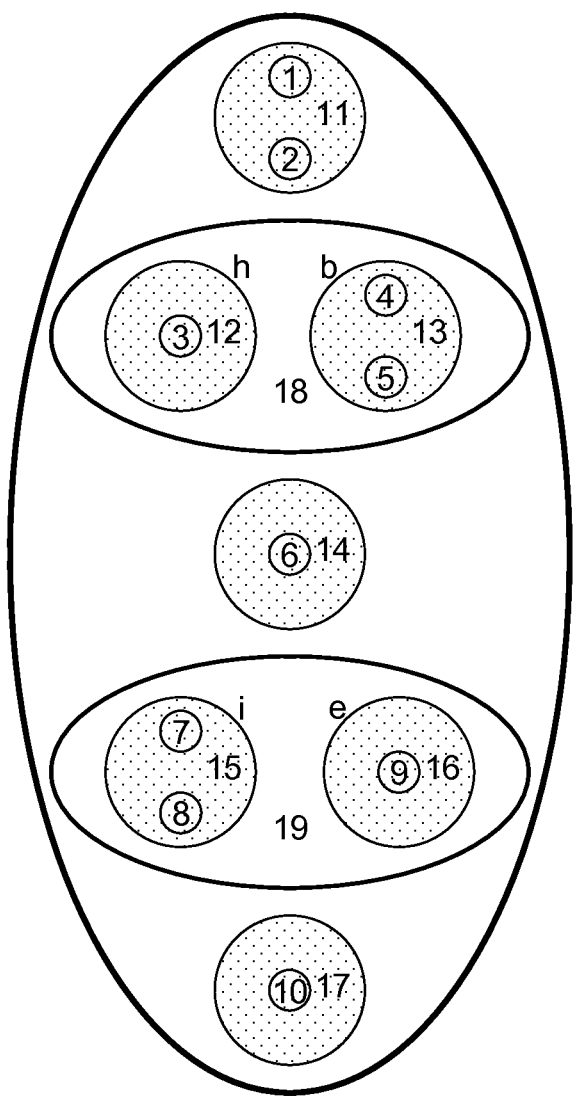
FIG. 19 is another schematic representation of a structural graph.

To illustrate this idea, suppose a user wishes to know the execution time between instruction node 4 and instruction node 7 in FIG. 19. In this example, the nodes 1 to 10 represent primitive instruction nodes, and the nodes 11 to 17 represent basic blocks. The nodes 12 and 13 have then been wrapped up by the structural analyser into a loop-type structure node 18 (with head h and body b), and the nodes 15 and 16 have been wrapped up into a conditional-type node 19 (with if clause i and else clause e). The whole sequence of nodes 11, 18, 14 to 19 has then been wrapped up into an even higher level node 20.

Figure 20:
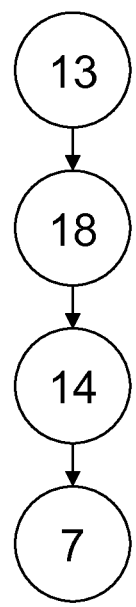
FIG. 20 is a schematic representation of a substructure graph.

It would be advantageous to generate a route between these two instructions 4 and 7 (i.e. a route in terms of program control flow), but represented only in terms of the highest level nodes necessary to obtain the required execution time. This can be achieved by stripping away the structure of some of the nodes where appropriate in order to take into account the low-level start and end point instruction nodes of the route, but whilst also maintaining the higher level structure of some others of the nodes where the lower level structure is irrelevant and therefore would add needless complexity if expanded. FIG. 20 is an example of such a route generated for the simplified scenario of FIG. 19: here, it would be superfluous to include some of the lower level structure such as instruction nodes 5 or 6 in the route. Instead, the route can be described in terms of nodes of different structural levels: in this case the generated route comprises basic block node 13, to higher-level structure node 18, to basic block node 14, then to primitive instruction node 7.

Thus some structure nodes can be included as a whole into the generated route without needing to include details of their internal structure. E.g. the loop count of a loop-type structure node can be maintained "wrapped up" in a single structural unit. So when determining the execution time for the route, the execution time for the whole higher-level structure node can be considered as a whole, as a single contributing time value, without needing to break it down into lower-level component times or take into account its internal structure. On the other hand, where necessary to accommodate the start and end points with a finer resolution, some other structure nodes are probed in more structural detail down into lower levels, removing some structure where appropriate and adding only the required lower-level structure to the route (e.g. node 7 in the resulting graph of FIG. 20).

Another possible reason to strip away the internal structure of nodes is to take into account exclusions, i.e. instructions the user has specified should be excluded from the modelled route. E.g. in the example of FIGS. 19 and 20 the instruction node 9 has been specified as excluded. The idea of exclusions will be discussed in more detail later.

Figure 3:
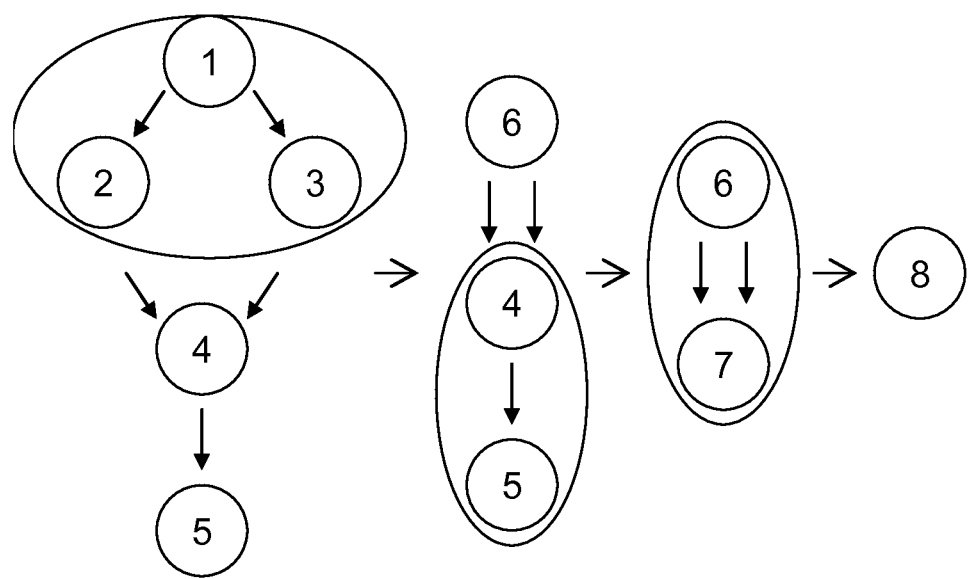
FIG. 3 is a schematic illustration of a structural analysis process.

In order to best find which levels of node to maintain and which to strip away, in embodiments of the present invention there is provided a further tool in the form of a "route finder" or "route construction" algorithm. This takes a higher-level structural representation of a program control flow and "burrows down" in order to find the time between any two arbitrary points in the program. This route construction algorithm can be used on any higher-level structural representation, either as generated by the above structural analyser such as discussed in relation to FIG. 13 or 19, or on any other higher-level structural representation such as a more conventional kind as discussed in relation to FIG. 3. The higher-level structural representation of control flow comprising the higher-level structure nodes may be referred to herein as the "structural graph" (distinct from the lower-level control flow graph), but note again that this refers most generally to any suitable data structure describing the program control flow on a higher structural level and does not necessarily mean that the structural graph need be displayed visually to a user (though preferably the route construction algorithm is operable to display a visual version of the structural graph on screen). The structural graph is the higher-level "wrapped up" representation, whereas the lower-level control flow graph is the representation consisting only of basic blocks or individual primitive instruction nodes. "Structure" or "structural" refers to something comprising or representing a plurality of lower-level internal elements.

Note therefore that the route construction algorithm starts with a higher-level structural graph after that structural graph has already been generated by the structural analyser, then probes downwards into its internal structure; rather than beginning with a lower-level control flow graph and working upwards. The route construction algorithm thus extracts a substructure graph from the structural graph (e.g. extracting the substructure graph of FIG. 20 from the structural graph of FIG. 19), in order to represent the desired route through the program.

The route construction algorithm accepts as its input: (a) a higher-level structural graph generated by a structural analyser algorithm, and (b) a route description identifying one or more start points and one or more end points within the represented program. The start and end points are preferably input by a user, and are the points between which the user wishes to determine the time that will be taken for execution on the target processor. Each of the start and end points may be specified as being any individual instruction within the program.

The route construction algorithm produces a separate result for each start point, with the result for each start point being the worst-case time of all end points (i.e. the time to reach the latest end point).

This route construction algorithm accepts the structural graph, G, along with the user's route description information, and reduces it to a set of one or more substructure graphs (one for each start point). The desirability of this algorithm arises from the need to derive from G a substructure graph that is of interest to the user. Consider the need to find the paths through a function with one entry point, one exit point and containing no exclusions: this case is trivial as searching and extracting the function node is trivial. However, if the user is interested in the paths from a particular instruction to any other instruction, e.g. from one input or output (I/O) operation to another, then the extraction of the possible paths is now non-trivial. The task is also non-trivial if one or more specified instructions are to be excluded from the path through a function. For such tasks this algorithm exists.

A route is a collection of all possible paths from a start instruction (start point) to a set of one or more end instructions (end points). Whether or not the paths are considered to include the end instructions or not depends on the mode of analysis.

The route description is a high level description of the route from which the start and end nodes can be derived. The two ways of describing a route are either to specify the start and end instructions that form the possible paths of the route, or to specify the name of a function to be considered. In the case of providing a function name, the end instructions are included in the route and in the other case they are not included. In particularly preferred embodiments, the route description may also have the option of including the paths of execution that the user wants to be excluded from the resulting control-flow graphs.

The start instructions are a set of instruction nodes from which the route begins. For each start instruction a route can be constructed and represented in the form of a substructure graph.

As mentioned, the route construction algorithm may optionally also receive one or more exclusions as an input. When forming a route through a program there may be certain paths of execution that the user wants to exclude. For example, certain error cases may not be of interest or the user may be interested in a particular case in a switch statement. For this reason the possibility of excluding certain instructions and hence blocking paths of execution is a useful additional feature.

Figure 16:
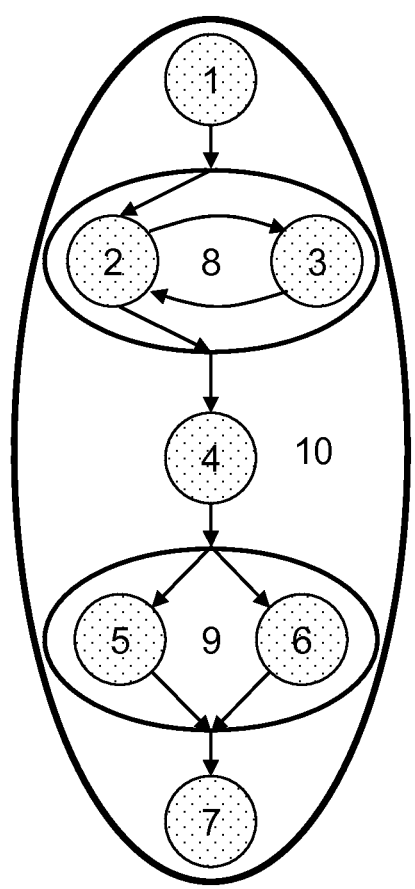
FIG. 16 is a schematic representation of a structural graph.

Before continuing, it will be useful to introduce some terminology which may be used to describe the following embodiments of the present invention. To aid understanding, reference is made to FIG. 16. In FIG. 16 the control-flow arrows (edges) have been added into the structural graph for ease of understanding. The lower-level nodes 1 to 7 represent basic blocks, the structure node 8 represents a loop-type structure node, the structure node 9 represents a conditional-type structure node, and the structure node 10 represents a sequence-type node. Node 10 is the highest level structure node, representing the whole structural graph.

A structure node p is called the parent of another node c (which may also be a structure node) if c is enclosed within p and not enclosed within any other nodes that p encloses (i.e. c is a child but not a "grandchild"). Using FIG. 16 as an example:

node 8 is the parent of nodes 2 and 3,
node 9 is the parent of nodes 5 and 6,
node 10 is the parent of nodes 1, 8, 4, 9 and 7.

The parent of a structure node c shall be referred to as the structure node c.parent.

Note also therefore that there may be multiple levels of parenthood: i.e. a child node c may itself be a structure node and therefore also a parent. In the example of FIG. 16, node 10 is the highest level parent, followed by nodes 8 and 9 at the next level of parenthood down, followed by nodes 1 to 7 which represent basic blocks and are parents only of individual primitive instruction nodes.

The children of a node p are the set of nodes c such that for every c the parent of c is p (i.e. grandchildren are not included in the set). This set includes direct and indirect children (see below for a definition of a direct child). Every node except the initial node, in this case node 10, has a parent. The children of a structure node p (including the indirect children) shall be referred to as the set p.iChildren.

The direct children of a node n are the nodes that are the initial nodes of the control-flow graph for n. Continuing using FIG. 16 as an example, the direct children are:

node 2 is the direct child of node 8,
node 1 is the direct child of node 10,
nodes 5 and 6 are the direct children of node 9.

All nodes except instruction nodes have direct children. The direct children of a structure node p shall be referred to as the set p.dChildren.

For both lower level control-flow graphs and higher-level structural graphs the definition of successors and predecessors is the same.

The successors of a node n are a set of nodes the come immediately after n and shall be referred to as the set n.succ.

The predecessors of a node n are a set of nodes the come immediately before n and shall be referred to as the set n.pred.

In general each set may contain zero, one or more nodes of the respective kind.

As mentioned, the goal of the route construction algorithm is to "burrow down" into the structural graph in order to obtain any required substructure graph representing program control flow between any two arbitrary specified points in the program, but at the same time without losing some of the higher-level structure of the structural graph. This allows the time for execution between any two arbitrary specified points in the program to be determined in a more efficient manner, without the prohibitive complexity of trying to work directly from the low level control flow graph. This idea should become more apparent with reference to the example of FIGS. 19 to 20 discussed again in more detail later, but first the preferred algorithm itself is described.

A difficulty with achieving the above aim is keeping track of the relative levels of the constructed route. This can be addressed using the route construction algorithm, an overview of which is given below.

The structural graph G, also known as the global structure, is never modified. The algorithm accepts a structural graph G and a route description then returns a set of one or more substructure graphs C. To give an overview, the route construction algorithm comprises the following main stages.

Stage 1: from the graph G, form a set S and a set E of instruction nodes from the route description that are all the start and end instructions respectively. E.g. in FIGS. 19 and 20 the set of start points comprises only one instruction node 4 and the set of end points comprises only one instruction node 7.

Stage 2: For each specified start point s∈S, add to the set N the node n which is found at the end of the following:

```
Node n = s;
while ((n.parent) .dChildren contains n) {
    n = n.parent;
}
```

This can be thought of as "zooming out" from the start point instruction to a higher level parent. It amounts to finding the highest level structure node (i.e. highest level parent) for which the start point is the initial instruction in that node.

For example in FIGS. 19 and 20, the algorithm works up the structural levels to determine that basic block node 13 is the highest level parent node for which the start point instruction node 4 is still the initial instruction, i.e. the highest level parent node which begins with instruction node 4 (at the next highest level the loop-type structure node 18 begins with the head node 12).

Stage 3: for each n∈N a route can be made by exploring G using each n as the start points. A constituent "structural graph exploration" algorithm is used to form the new substructure graphs that together form the output set C.

The structural graph exploration stage of the algorithm works by probing or "burrowing down" into a structure node to determine whether it comprises any endpoints, and optionally whether it comprises any exclusions (nodes the user has specified they want to exclude from the analysed program route). It works through the start node and each successor in turn, and for any node in which it doesn't find an endpoint it adds that whole structure node to the substructure graph (i.e. the whole node at that level of parenthood), generates the relevant edge to the predecessor, and then continues to the next successor. When an endpoint is found, it strips away the internal structure of the structure node to find a route from the predecessor through to the lower level endpoint instruction node. Edges may be redirected during this process as structure is stripped away.

The overall idea of this stage of the algorithm is to maintain as much structure as possible from the original structural graphs, whilst removing the paths the user has selected for removal using exclusions. The result of the algorithm will be a set of one or more new substructure graphs of structure nodes (one substructure graph for each start point s). The substructure graph is essentially a window on the original structural graph G as specified by the route.

Referring again to the example of FIGS. 19 and 20, the structural graph exploration stage determines that node 18 is the predecessor of node 13, then determines that node 18 does not contain the end point and so adds the whole node 18 to the substructure graph and generates an edge within the substructure graph from node 13 to node 18. The structural graph exploration stage then determines that node 14 is the successor of node 18, but finds that node 14 again does not contain the end point and so adds the whole node 14 to the substructure graph and generates an edge within the substructure graph from node 18 to node 14. Following that, the structural graph exploration stage determines that node 19 is the successor of node 14, and finds that this does contain the end point instruction node 7. It then probes the internal structure of node 19, discards any irrelevant internal structure of node 19 and adds the relevant internal structure to the substructure graph—in this case simply the endpoint node 7 and an edge joining from node 14.

Further details of a preferred structural graph exploration stage (stage 3) of the route construction algorithm are now discussed. The following variable names are used:

workingSet contains the structure nodes of the new substructure graph being generated, currentNode is the current node that the algorithm is working on, and predecessor is the node that precedes the currentNode.

This exploration stage of the algorithm comprises three main methods, that all return true when an end instruction has been found:

the explore function's job is to make the decision on the direction of the traversal of the global tree, the exploreSuccessors function's job is to update the workingSet along with its edges then explore all the currentNode's successors, the exploreIntoCurrentNode function's job is to remove a currentNode's structure and explore the direct children of the currentNode.

Figure 17:
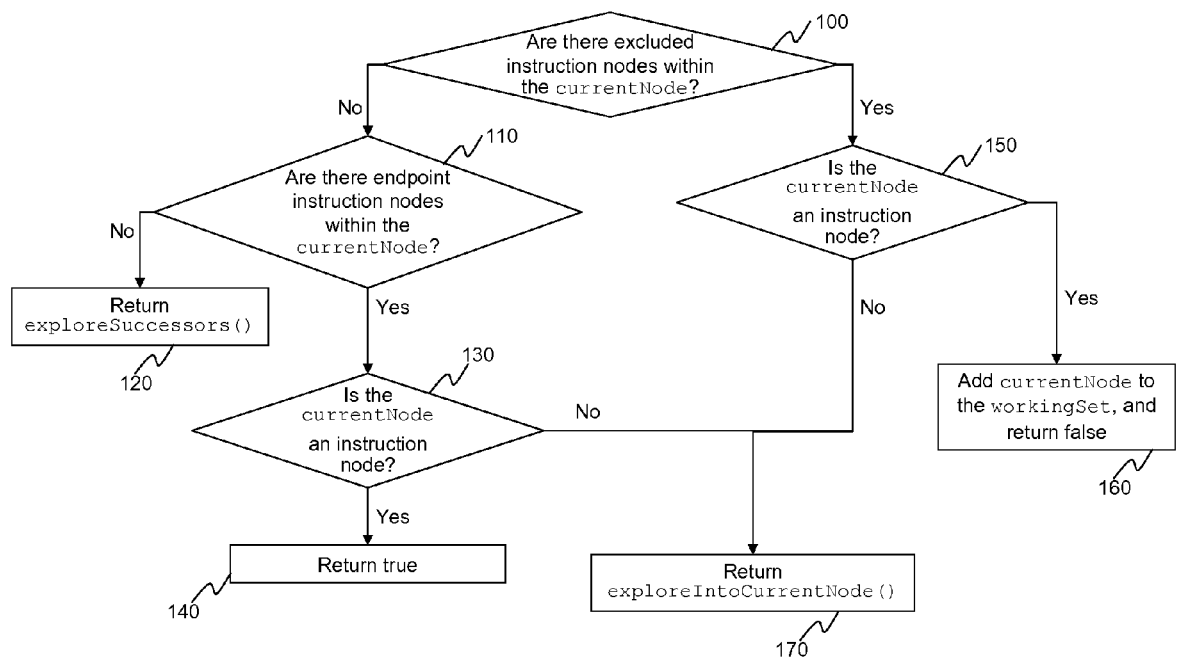
FIG. 17 is a flow chart of a part of a route construction algorithm.

The explore function takes the structure node currentNode and, based on a number of decisions as illustrated in FIG. 17, decides in what manner to update the workingSet. It begins with the node as determined in stage 2 above.

As shown in FIG. 17, the explore function begins at step 100 by determining whether there are any excluded instruction nodes within the currentNode. If not the explore function proceeds to step 110 where it determines whether there are any end point instruction nodes within the currentNode. If not it calls exploreSuccessors at step 120 and returns its result, but if so it proceeds to step 130 where it determines whether the currentNode is a primitive instruction node (i.e. the lowest possible level). If the currentNode is not a primitive instruction node, the explore function calls exploreIntoCurrentNode at step 170 and returns its result; but if the currentNode is a primitive instruction node then the explore function proceeds to step 140 where it returns the result "true".

If on the other hand the explore function determines at step 100 that there are any excluded instruction nodes within the currentNode, then it proceeds to step 150 where it determines whether the currentNode is a primitive instruction node (i.e. the lowest possible level). If not the explore function calls exploreIntoCurrentNode at step 170, but if it is then the explore function proceeds to step 160 where it adds the currentNode to the workingSet and returns the result "false".

The exploreSuccessors function is called when the decision has been made that the currentNode will contribute all of itself to the workingSet (see step 120 of the explore function). That is, any path of execution entering the currentNode can reach any of the nodes within the currentNode and will leave by the exit of the currentNode. The exploreSuccessors function is shown in the flow chart of FIG. 18a and operates as follows.

Figure 18A:
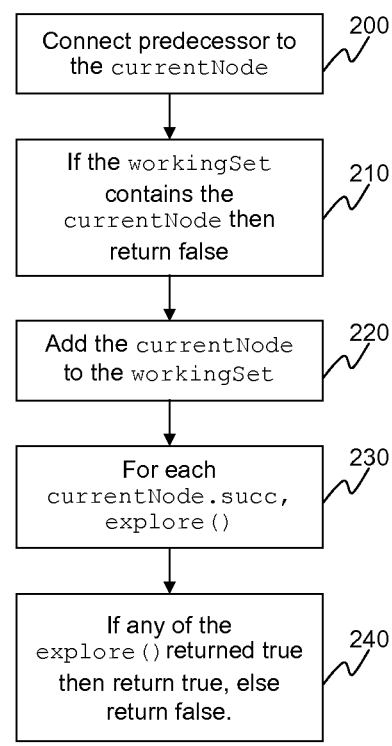
FIG. 18*a* is a flow chart of another part of a route construction algorithm.

As shown in FIG. 18a, the exploreSuccessors function begins at step 200 where it connects the predecessor to the node currentNode. Then at step 220, if the workingSet contains the currentNode then the exploreSuccessors function returns the result "false". Otherwise at step 230 it adds the currentNode to the workingSet. Then at step 240, for each of the nodes currentNode.succ, the exploreSuccessors function calls another instance of the explore function. A step 250, if any of the instances of explore returned "true" then the exploreSuccessors function returns "true", else it returns "false".

The exploreIntoCurrentNode function is called when a currentNode is encountered that either contains an end instruction node or contains an excluded instruction node (see step 170 of the explore function). The purpose of this exploreIntoCurrentNode function is to remove the current level of structure then to explore the component parts. The exception to this is when a function node is found to have an exclusion within it. In this case the function node is explored as a new route with exclusions, and the resulting control-flow graph has structural analysis performed on it to reduce it to a structure node then is reinserted into the original function node. The reason for this is to maintain the function call hierarchy for ease of understanding for the user. The exploreIntoCurrentNode function is shown in the flow chart of FIG. 18b.

Figure 18B:
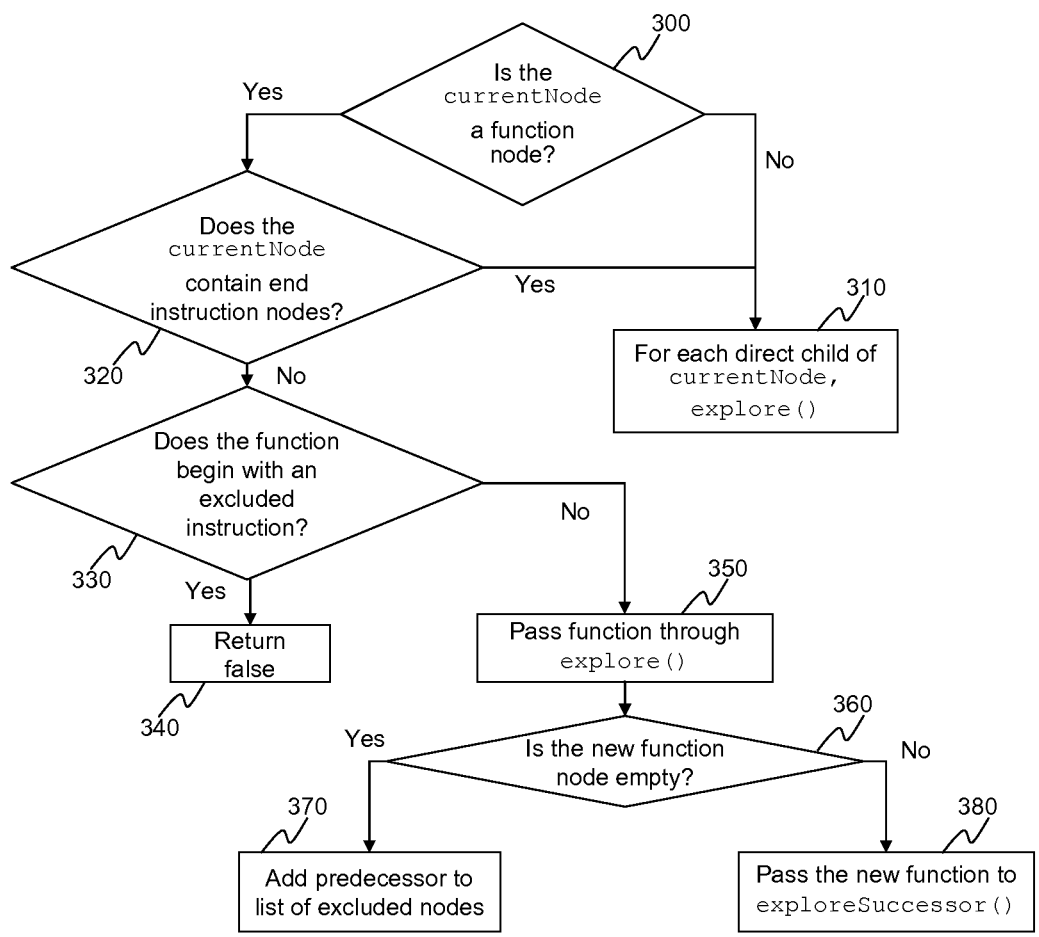
FIG. 18*b* is a flow chart of another part of a route construction algorithm.

As shown in FIG. 18b, the exploreIntoCurrentNode function begins at step 300 where it determines whether the currentNode is a function node. If not, the exploreIntoCurrentNode function proceeds to step 310 where it calls another instance of the explore function for each direct child of the currentNode. If the currentNode is a function node on the other hand, the exploreIntoCurrentNode function proceeds to step 320 where it determines whether the currentNode contains any end point instruction nodes. If so, it proceeds to step 310 where it calls another instance of the explore function for each direct child of the currentNode. If the currentNode does not contain any end point instruction nodes on the other hand, then the exploreIntoCurrentNode function proceeds to step 330 where it determines whether the function begins with an excluded instruction node, and if so returns "false" at step 340. If not on the other hand, the exploreIntoCurrentNode function proceeds to step 350 where it passes the function node through another instance of the explore function. Depending on whether the explore function returns true or false, at step 360 the exploreIntoCurrentNode function determines whether the resulting new function node is empty. If so it proceeds to step 370 where it adds the predecessor to the list of excluded nodes, but if so it proceeds to step 380 where it passes the new function to an instance of the exploreSucessor function.

The example of FIGS. 19 and 20 is now discussed in more detail. FIG. 19 could represent a program compiled from code such as:

```
int main( ) {
    int i = 0;
    while (i<10) {
        i ++;
    }
    if (i<50) {
        i ++;
    } else {
        }i = i - 50;
    }
    return i;
}
```

Below is an example of the process the route construction algorithm would go through to reach an output substructure graph as illustrated in FIG. 20, for a route from instruction Node 4 to instruction node 7 with instruction node 9 excluded. Therefore in this example the route is from the body of the loop node 18 to one of the conditions of the conditional node 19. The steps taken would be as follows.
(i) The set S would contain the single entry of node 4, and similarly the set E would contain the single entry of node 7.
(ii) The node 4 in the set S would then be used to find the starting node which would be node 13 as that is the greatest parent of node 4 such that it still would begin with node 4. Node 13 would then be added to the set N.
(iii) The graph exploration begins at node 13. The explore function would decide that as node 13 contains no end points the exploreSuccessors would get called. The only successor of node 13 is node 18.
(iv) Node 13 would get added to the substructure graph.
(v) Node 18, not containing any end instruction would be added to the substructure graph and an edge from node 13 to node 18 would be added to the substructure graph.
(vi) The same process would be performed for node 14 as it too contains no end instruction nodes.
(vii) Node 14 would get added to the substructure graph and an edge between node 13 and node 14 would be added.
(viii) Following on from node 14, node 19 would get explored next, this node contains an end instruction node which would cause the explore function to call exploreIntoCurrentNode. For each of the direct children of node 19 the explore function would make a decision.
(ix) For node 15 the algorithm would have to call exploreIntoCurrentNode which would find its way to node 7, which would get added to the substructure graph and a connection from node 14 to node 7 would be added.
(x) For node 16 the algorithm would have to call exploreIntoCurrentNode which would find its way to node 9. Node 9 is excluded so the algorithm would stop.

The resulting substructure graph would thus look like FIG. 20. As discussed, such a substructure graph of the structural graph can advantageously be used to determine the execution time for the route based on the respective times of the different structural levels of node along the route. The invention thus provides an efficient way to determine the time between any two arbitrarily chosen points in a program. If required, the user can then make a modification to improve the timing, e.g. by modifying the program itself or modifying a property of the processor such as its clock speed.

It will be appreciated that the above embodiments have been described only by way of example. Other applications or configurations of the present invention may be apparent to a person skilled in the art given the disclosure herein. The present invention is not limited by the described embodiments, but only by the appendant claims.

The invention claimed is:

1. A method executable by a processor, comprising:
receiving as an input: (a) a higher-level structure representing control flow through an executable program, the higher-level structure comprising multiple levels of reduced nodes, each reduced node representing internal structure comprising both a group of one or more unreduced nodes representing respective basic blocks and/or one or more other reduced nodes and one or more associated edges between those nodes, and (b) an indication of at least one start instruction and at least one end instruction;
wherein said multiple levels of reduced nodes comprise first and second levels of reduced nodes and each reduced node of the second level represents a group comprising one or more reduced nodes of the first level;
the method further comprising:
probing the levels of the higher-level structure to extract a substructure representing a route through the program, from the start to the end instruction, by selectively extracting nodes of different levels to represent different regions along the route in dependence on a location of the start and end instructions relative to the reduced nodes, wherein said selective extraction comprises: extracting at least one reduced node of the second level and at least one reduced node of the first level, from another node of the second level and adding each of the extracted nodes to the substructure representing the route; and
based on the extracted substructure, estimating an overall execution time for the entirety of the route through the program represented by the extracted substructure, and making a modification affecting the execution time in dependence on said estimation wherein the estimation of said execution time is based on a determination of an associated time for the extracted nodes.

2. The method of claim 1, wherein the extraction comprises steps of:
(i) determining the highest level reduced node for which the start instruction is the initial instruction in the reduced node, and setting this reduced as the current node;
(ii) adding the current node to the substructure, determining whether the current node comprises a node representing an end instruction, and if not determining a successor of the current node and then setting the successor as the new current node and repeating step (ii) until the current node is found to comprise a node representing an end instruction; and
(iii) once an end instruction is found in the current node, exploring the internal structure of the current node and adding to the substructure a portion of that internal structure representing a relevant portion of the route to the end instruction;
such that said estimation and modification are based on the substructure as extracted by said steps.

3. The method of claim 1, wherein the estimation of said execution time comprises determining an associated time for each of the nodes in the substructure and combining the associated times, each associated time corresponding to the level of its respective corresponding higher-level node as included in the substructure, and the estimation being performed on the basis of each associated time as a whole.

4. The method of claim 1, wherein the estimation of said execution time is performed after generation of said substructure and without analysing the internal structure of any node in the substructure once extracted.

5. The method of claim 1, wherein the method further comprises receiving as an input: (c) an indication of at least one excluded instruction;
wherein the substructure represents a route excluding the excluded instruction, the extraction being dependent on a location of the excluded instruction relative to the reduced nodes.

6. The method of claim 2, wherein
the method further comprises receiving as an input: (c) an indication of at least one excluded instruction;
the substructure represents a route excluding the excluded instructions, the extraction being dependent on a location of the excluded instruction relative to the reduced nodes;
step (ii) comprises determining whether the current node comprises a node representing either of an end instruction or an excluded instruction, and repeating step (ii) until the current node is found to comprise a node representing either an end instruction or excluded instruction; and
step (iii) comprises exploring the internal structure of the current node and adding to the substructure a portion of that internal structure a relevant portion of the route to the end instruction or excluding the excluded instruction as appropriate, and repeating from step (ii) if the current node was determined to contain an excluded instruction but not an end instruction.

7. The method of claim 1, comprising receiving an indication of multiple start instructions as an input, extracting a separate substructure for each start instruction, and estimating a respective execution time based on each substructure, said modification being dependent on the execution times.

8. The method of claim 1, comprising receiving an indication of multiple end instructions as an input, wherein said estimation comprises estimating a worst case execution time with respect to all end instructions, and said modification is dependent on the worst case execution time.

9. The method of claim 1, wherein at least one of the nodes representing a start instruction is not found at the beginning of any reduced node, and/or at least one of the nodes representing an end instruction is not found at the end of any reduced node.

10. The method of claim 1, wherein the higher-level structure comprises at least an additional third level of reduced node, each reduced node of the third level represents a group comprising one or more reduced nodes of the second level.

11. The method according to claim 1, comprising initial steps of decoding said portion of the executable program, generating a lower-level structure representing the executable program based on said decoding, and then generating the higher-level structure from the lower-level structure.

12. The method according to claim 1, wherein said modification comprises modifying the executable program.

13. The method according to claim 12, wherein said modification comprises modifying a portion of source code and re-compiling the program from the source code.

14. The method according to claim 1, wherein said modification comprises changing a characteristic of the processor.

15. The method according to claim 14, wherein said modification comprises changing a clock speed of the processor.

16. The method according to claim 15, wherein said changing of the clock speed is by executing an instruction to do so.

17. A software tool embodied on a computer readable memory and operable so as when run on a computer to perform the method of claim 1.

* * * * *